No. 607,520. Patented July 19, 1898.
T. R. McKNIGHT.
WHEELED SCRAPER.
(Application filed May 14, 1897.)
(No Model.) 4 Sheets—Sheet 4.
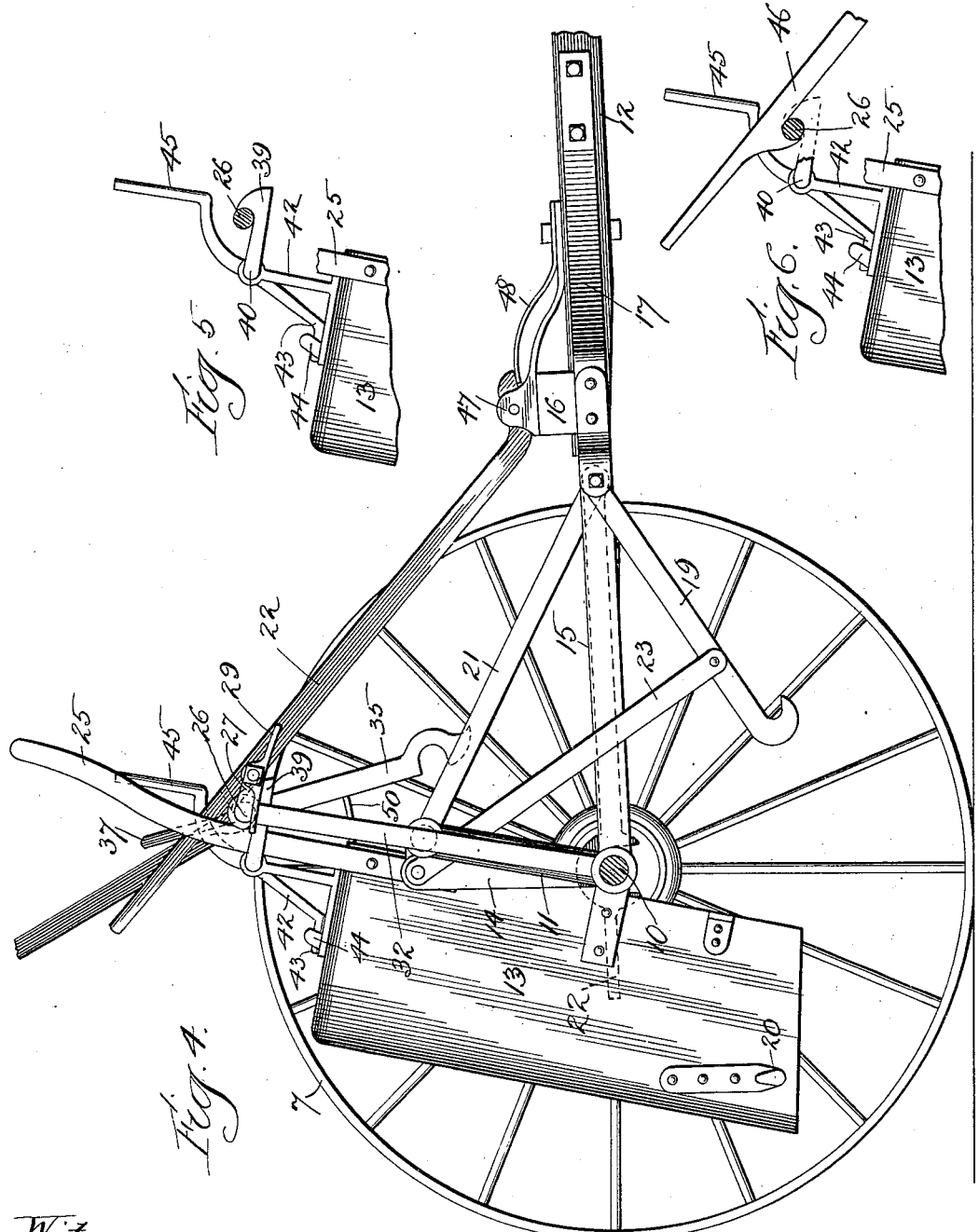

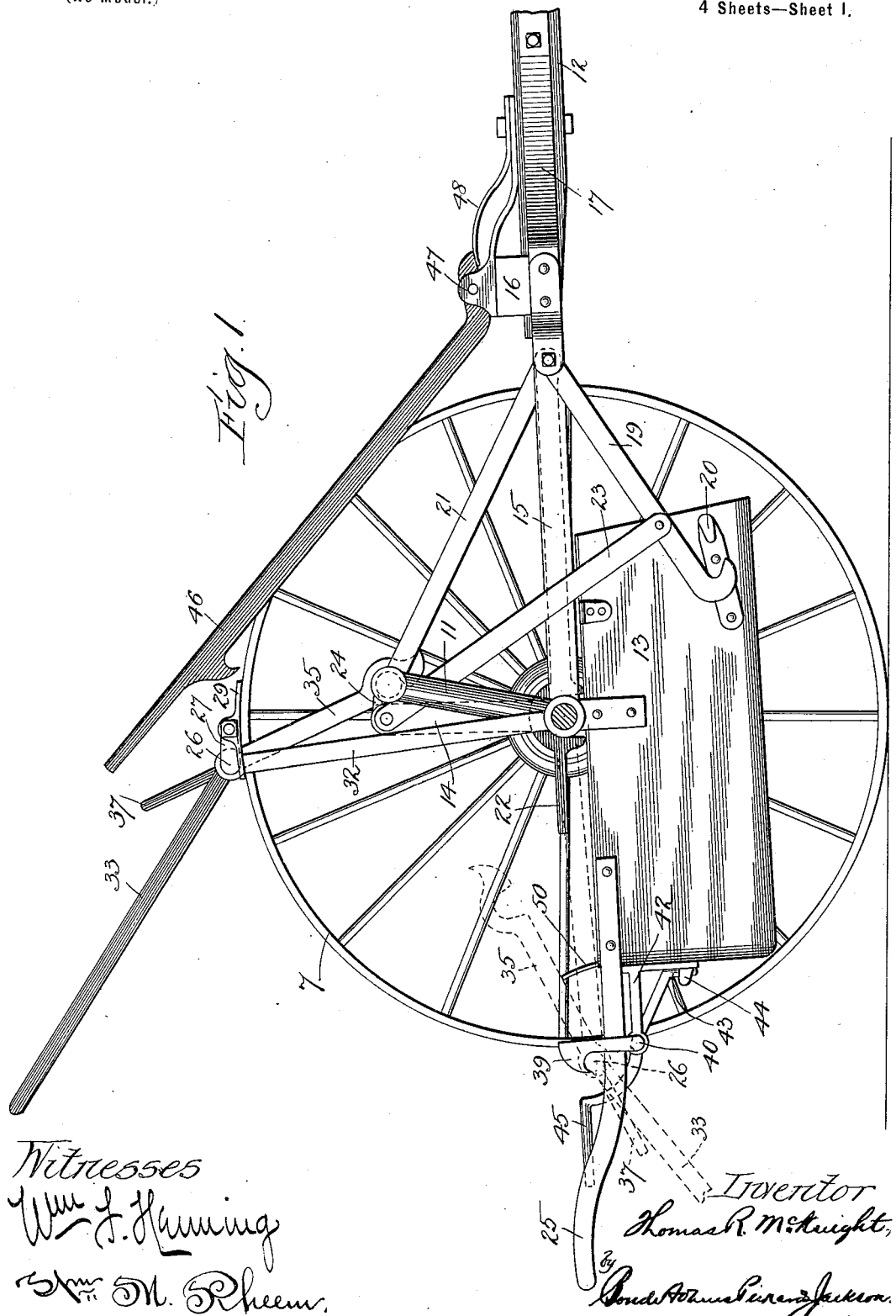

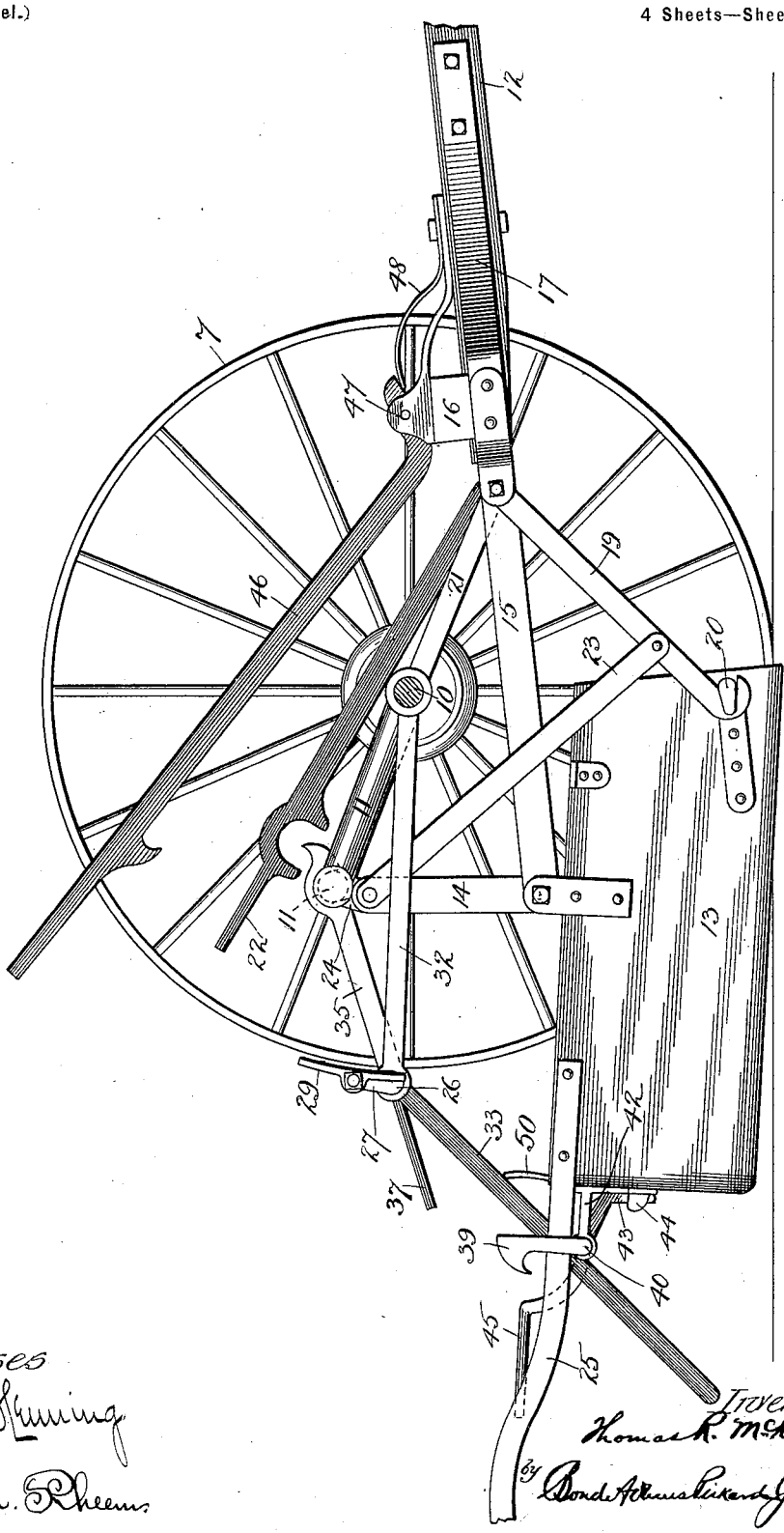

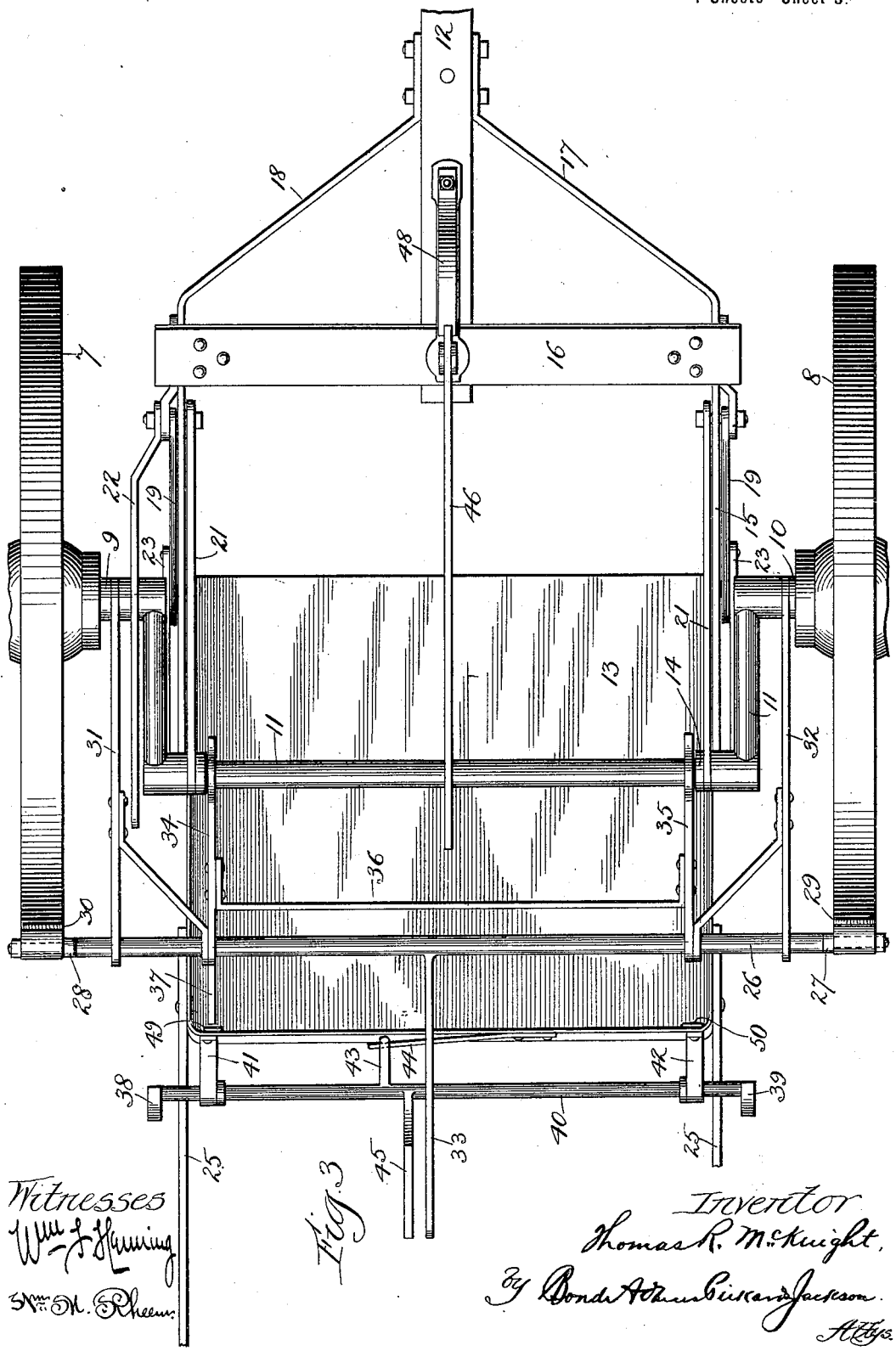

UNITED STATES PATENT OFFICE.

THOMAS R. McKNIGHT, OF AURORA, ILLINOIS, ASSIGNOR TO THE WESTERN WHEELED SCRAPER COMPANY, OF SAME PLACE.

WHEELED SCRAPER.

SPECIFICATION forming part of Letters Patent No. 607,520, dated July 19, 1898.

Application filed May 14, 1897. Serial No. 636,466. (No model.)

*To all whom it may concern:*

Be it known that I, THOMAS R. McKNIGHT, a citizen of the United States, residing in Aurora, Kane county, Illinois, have invented certain new and useful Improvements in Wheeled Scrapers, whereof the following is a specification.

My invention relates to wheeled scrapers, and has for its objects to provide means whereby the scraper-pan may be dumped by power applied through the wheels; also, to provide means whereby the pan may be raised from loading to carrying position and be afterward dumped by the draft of the team acting by means of the rotation of one or both wheels. These are the principal features of my invention, although said invention includes also various improvements in the construction of wheeled scrapers, as will be hereinafter pointed out.

In the accompanying drawings, Figure 1 is a side elevation, one wheel being removed and the wheel-spindle being shown in section, the pan being shown in carrying position. Fig. 2 is a similar view, the pan being in loading position. Fig. 3 is a plan view. Fig. 4 is a view similar to Fig. 1, showing the pan in dumping position. Figs. 5 and 6 show details of the rear end of the scraper-pan and coacting parts.

Referring to the drawings for a detailed description of the scraper therein illustrated, 7 8 indicate the carrying-wheels, which are mounted upon spindles 9 10 at the ends of an arched axle 11.

12 indicates the tongue or pole.

13 indicates the scraper-pan, which is pivotally suspended by links 14 from the upper portion of the arched axle 11, as best shown in Fig. 2, the arrangement being such that when the arched axle is inclined backward, as shown in Fig. 2, the pan 13 will be lowered to loading position, as there indicated, and when the arch of the axle is thrown up to the position shown in Fig. 1 the scraper-pan will be raised to carrying position, as indicated in said figure.

The draft of the team is applied to the scraper-pan for loading purposes through bars 15, which are connected to the tongue through the instrumentality of a cross-head 16, as shown in Fig. 3, braces 17 18 being provided for the cross-head 16. Draft-hooks 19, which engage with hooks 20 at the sides of the scraper-pan, as shown in Fig. 2, further serve to hold the pan in proper position when loading.

21 indicates bars which are connected to the cross-head 16 and to the arch of the axle 11 and serve, with the bars 15, to hold the parts of the machine rigid in loading. When the scraper-pan is raised to carrying position, as shown in Fig. 1, the bars 15 21 assume the position shown in said figure, the bars 15 being then substantially in line with the axle-spindles, and when the parts are in the position shown in Fig. 1 the bars 15 21, in connection with hooks 22, which are pivotally connected at their forward ends to the cross-head 16 and at their rear ends receive the axle-spindles when the pan is in carrying position, serve to hold the machine rigid while in the carrying position, so that the draft of the team is properly transmitted thereto. The hooks 19 are automatically thrown out of engagement with the hooks 20 when the pan is raised to carrying position by straps 23, which are connected to said hooks and to ears 24, projecting from the arched axle 11, as shown in Figs. 1 and 2.

25 indicates the handles of the scraper-pan.

26 indicates a rock-shaft which extends across the rear of the machine and carries on crank-arms 27 28 brake-shoes 29 30, respectively, said brake-shoes being arranged opposite the rims of the wheels, as shown in Fig. 3. The rock-shaft 26 is connected by links 31 32 to the axle-spindles 9 10, the length of the links 31 being such that the brake-shoes 29 30 are normally held near the rims of the wheels, so that by rocking the rock-shaft 26 the brake-shoes may be set against the wheels.

33 indicates a hand-lever which is connected to the rock-shaft 26 and extends rearwardly therefrom. The hand-lever 33, as herein shown, is made somewhat long, and its weight serves normally to hold the rock-shaft 26 in such position that the brake-shoes are out of contact with the wheels.

34 35 indicate hooks which are pivotally mounted upon the rock-shaft 26 and are connected by a cross-bar 36, as shown in Fig. 3.

37 indicates a rearwardly-projecting arm which is connected to the hook 34, so that the hooks 34 35 may be rocked by manipulating the arm 37. The forward ends of the hooks 34 35 are adapted to receive the arched portion of the axle 11, the object of which will be hereinafter set forth.

38 39 indicate hooks connected by a shaft 40, journaled in brackets 41 42, secured to the rear of the scraper-pan, as shown in Figs. 1 and 3. The hooks 38 39 are held normally substantially parallel with the rear end of the scraper-pan by an arm 43, which engages a spring 44, carried by the scraper-pan, as shown in Fig. 3. The hooks 38 39 may, however, spring forward slightly to permit the rock-shaft 26 to be received by such hooks when moved downward, as will be hereinafter described, and to facilitate such downward movement of the rock-shaft 26 the upper rear edges of the hooks 38 39 are beveled, as shown in Fig. 1.

45 indicates a hand-lever connected to the shaft 40 for rocking the same to disengage the hooks 38 39 from the rock-shaft 26 when desired.

46 indicates a hooked bar pivoted at its forward end upon the rear end of the tongue or the cross-head 16, as shown at 47 in Fig. 1, which hooked bar extends upward and backward in suitable position to catch the rock-shaft 26 when it moves to its uppermost position in dumping the scraper-pan, as shown in Fig. 4.

48 indicates a spring which is secured upon the tongue and exerts upward pressure against the heel of the hooked bar 46, as shown in Fig. 1, thereby giving such bar enough of a spring action to cause it to properly perform its work.

49 50 indicate stops projecting upward from the rear of the scraper-pan 13, which stops serve to support the hooks 34 35 and hold them up out of engagement with the arched axle when the scraper-pan is dumped, as shown in Fig. 4.

The operation of my improved scraper is as follows: When the scraper-pan is being loaded, it is in the position shown in Fig. 2, the brake-shoes 29 30 being then out of engagement with the wheels and the various hooks being in the position shown in said figure. When it is desired to raise the pan to carrying position, the operator simply swings upward the lever 33, thereby rocking the shaft 26 and setting the brake-shoes against the wheels. The brake-shoes will therefore be carried up by the wheels as they rotate, which movement will be transmitted through the hooks 34 35 to the arched axle 11, and as the axle swings forward the pan will be lifted by means of the links 14. This movement of the arched axle will also move the tongue forward to such a point that the hooks 22 will engage the wheel-spindles, as shown in Fig. 1. When the brake-shoes are moved to an angle of about ninety degrees to the position shown in Fig. 1, the lever 33 is released, when its weight will be sufficient to rock the rock-shaft 26 in the opposite direction, throwing the brake-shoes out of engagement with the wheels. The hooks 34 35 are at the same time released from the arched axle 11. The rock-shaft 26 will thereupon swing backward in the arc of a circle, and as the hooks 38 39, carried by the scraper-pan, will have been moved upward to the position shown in Fig. 1 by the raising of the pan the rock-shaft 26 will strike such hooks and will be caught by them, as indicated by dotted lines in Fig. 1. The pan may then be transported to the desired dump. To dump the pan, the lever 33 is again raised to rock the shaft 26 and set the brake-shoes 29 30, when the brake-shoes will be carried up by the forward movement of the machine through an arc of about one hundred degrees to the position shown in Fig. 4. The hooks 38 39 being in engagement with said rock-shaft, the rear end of the pan will be carried up with the brake-shoes, dumping the pan, as shown in Fig. 4. When the rock-shaft 26 moves upward to the position indicated, it will be caught by the hook 46, which serves to retain the pan in its dumped position; but the brakes will be moved out of contact with the wheels by the weight of the lever 33, so that the scraper may be driven back to the loading-place, the pan remaining in its vertical or dumped position.

I have described in detail my improved scraper as illustrated in the accompanying drawings; but I wish it to be understood that my invention is not limited to the specific details of such construction, as many modifications may be made without departing from such invention. Many of the parts are shown in duplicate, as such construction secures better results; but I wish it to be understood that I do not limit myself to the use of duplicate parts in all instances nor to other details except where specifically claimed.

That which I claim as my invention, and desire to secure by Letters Patent, is—

1. In a scraper, the combination with a wheeled carriage, and an arched axle, of a scraper-pan suspended from said axle, brake mechanism, and means for connecting the brake mechanism with and disconnecting it from said arched axle, substantially as and for the purpose specified.

2. In a scraper, the combination with a wheeled carriage, and an arched axle, of a scraper-pan suspended from said axle, brake mechanism, and a rigid connecting device for connecting the brake mechanism with and disconnecting it from the said arched axle, substantially as and for the purpose specified.

3. In a scraper, the combination with a wheeled carriage, of a scraper-pan, and brake mechanism for connecting the pan with one of the carriage-wheels for raising said pan to carrying position and also dumping it, substantially as described.

4. In a scraper, the combination with a wheeled carriage, of a scraper-pan, brake mechanism for connecting the pan with one of the carriage-wheels for raising said pan to carrying position, and for connecting said pan when in carrying position to one of the carriage-wheels, whereby the pan may be dumped by the rotation of such wheel, substantially as described.

5. In a scraper, the combination with an arched axle, and wheels, of a scraper-pan suspended from said axle, means adapted to be operated to connect the arched axle with one of the carriage-wheels for rocking the axle and raising the pan to carrying position, and means operated by the draft of the team for rocking the pan independently of the axle for dumping it, substantially as described.

6. In a scraper, the combination with an arched axle, wheels, and a scraper-pan, of devices connecting said pan to the arched portion of said axle, whereby the pan may be raised by rocking said arched axle, brake mechanism for rocking said arched axle by the draft of the team, and means for dumping the pan by the draft of the team, substantially as described.

7. In a scraper, the combination with an arched axle, wheels, and a pan, of devices supporting said pan from the arched portion of the axle, whereby the pan may be raised to carrying position by rocking said arched axle, brake mechanism for rocking said axle by the draft of the team, and brake mechanism for connecting said pan when in carrying position to one of said wheels, whereby the pan may be dumped by the rotation of such wheel, substantially as described.

8. In a scraper, the combination with an arched axle, wheels, and a pan, of devices suspending said pan from the arched portion of the axle, links 31 32 connected to the axle-spindles, a rock-shaft connected to said links, one or more brake-shoes carried by said rock-shaft, a lever whereby said rock-shaft may be rocked, and a rigid connecting device adapted to connect said rock-shaft with the arched portion of said axle, substantially as and for the purpose specified.

9. In a scraper, the combination with an arched axle, wheels, and a pan, of devices suspending said pan from the arched portion of the axle, links 31 32 connected to the axle-spindles, a rock-shaft connected to said links, one or more brake-shoes carried by said rock-shaft, a lever whereby said rock-shaft may be rocked, and a hook 34 adapted to connect said rock-shaft with the arched portion of said axle, substantially as and for the purpose specified.

10. In a scraper, the combination with an arched axle, wheels, and a pan, of devices suspending said pan from the arched portion of the axle, links 31 32 connected to the axle-spindles, a rock-shaft connected to said links, one or more brake-shoes carried by said rock-shaft, a lever whereby said rock-shaft may be rocked, a rigid connecting device adapted to connect said rock-shaft with the arched portion of said axle, and means for connecting the rear end of the scraper-pan to said rock-shaft, substantially as and for the purpose specified.

11. In a scraper, the combination with an arched axle, wheels, and a pan, of devices suspending said pan from the arched portion of the axle, links 31 32 connected to the axle-spindles, a rock-shaft connected to said links, one or more brake-shoes carried by said rock-shaft, a lever whereby said rock-shaft may be rocked, a rigid connecting device adapted to connect said rock-shaft with the arched portion of said axle, and a hook at the rear end of the scraper-pan, said hook being adapted to engage said rock-shaft, substantially as and for the purpose specified.

12. In a scraper, the combination with an arched axle, wheels, and a pan, of devices suspending said pan from the arched portion of the axle, links 31 32 connected to the axle-spindles, a rock-shaft connected to said links, one or more brake-shoes carried by said rock-shaft, a lever whereby said rock-shaft may be rocked, a rigid connecting device adapted to connect said rock-shaft with the arched portion of said axle, and hooks 22 and 46, substantially as and for the purpose specified.

13. In a scraper, the combination with a wheeled carriage, of a scraper-pan, brake mechanism adapted to be connected with the scraper-pan for raising said pan to carrying position by the movement of the carriage, and for dumping it, and means for throwing said brake mechanism into and out of operative connection with the scraper-pan, subtantially as described.

14. In a scraper, the combination with a wheeled carriage, of a scraper-pan, means operated by the draft of the team for raising said pan to carrying position, and brake mechanism for dumping the pan, substantially as described.

15. In a scraper, the combination with an arched axle, wheels, and a scraper-pan, of devices connecting said pan to the arched portion of the axle whereby the pan may be raised by rocking said arched axle, means for rocking said axle by the draft of the team to raise the scraper-pan to carrying position, and means operated by the draft of the team for dumping the pan independently of the arched axle, substantially as described.

16. In a scraper, the combination with an arched axle, wheels, and a scraper-pan, of devices connecting said pan to the arched portion of said axle whereby the pan may be raised to carrying position by rocking said arched axle, brake mechanism for rocking said axle by the draft of the team, said brake mechanism being adapted to operate independently of said axle for dumping the pan, substantially as described.

THOMAS R. McKNIGHT.

Witnesses:
  C. B. RUKGABER,
  J. R. SIMPSON.